(12) United States Patent
Takeuchi et al.

(10) Patent No.: US 11,636,002 B2
(45) Date of Patent: Apr. 25, 2023

(54) INFORMATION PROCESSING DEVICE AND INFORMATION PROCESSING METHOD

(71) Applicant: Panasonic Intellectual Property Management Co., Ltd., Osaka (JP)

(72) Inventors: Akihito Takeuchi, Osaka (JP); Toshihisa Nakano, Osaka (JP); Kaoru Yokota, Hyogo (JP); Yuishi Torisaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/738,695

(22) Filed: May 6, 2022

(65) Prior Publication Data

US 2022/0261304 A1    Aug. 18, 2022

Related U.S. Application Data

(63) Continuation of application No. PCT/JP2020/039797, filed on Oct. 22, 2020.

(30) Foreign Application Priority Data

Nov. 11, 2019   (JP) .............................. JP2019-204314

(51) Int. Cl.
*G06F 11/00*     (2006.01)
*G06F 11/07*     (2006.01)

(52) U.S. Cl.
CPC ........ *G06F 11/0769* (2013.01); *G06F 11/006* (2013.01); *G06F 11/07* (2013.01);
(Continued)

(58) Field of Classification Search
CPC ... G06F 11/07; G06F 11/0736; G06F 11/0739
See application file for complete search history.

(56) References Cited

U.S. PATENT DOCUMENTS

| 9,173,100 B2* | 10/2015 | Ricci .................. H04W 12/125 |
| 2012/0096477 A1* | 4/2012 | Lee ....................... G06F 11/079 |
| | | 707/602 |

(Continued)

FOREIGN PATENT DOCUMENTS

| JP | 2003-092603 A | 3/2003 |
| JP | 2017-111796 A | 6/2017 |

(Continued)

OTHER PUBLICATIONS

International Search Report issued in International Bureau of WIPO Patent Application No. PCT/JP2020/039797, dated Dec. 22, 2020, together with an English translation.

(Continued)

*Primary Examiner* — Joshua P Lottich
(74) *Attorney, Agent, or Firm* — Greenblum & Bernstein, P.L.C.

(57) ABSTRACT

An information processing device that detects an anomaly in an in-vehicle network provided in a vehicle includes: a local rule storage in which at least an individual rule which is a rule generated for the vehicle is stored; a global rule storage in which an integrated rule which is a rule generated for a plurality of vehicles including the vehicle is stored; and a processing unit that performs, using a rule stored in at least one of the local rule storage or the global rule storage, an anomaly detection process on a frame transmitted on the in-vehicle network.

11 Claims, 9 Drawing Sheets

(52) U.S. Cl.
CPC ...... *G06F 11/0736* (2013.01); *G06F 11/0739* (2013.01); *G06F 11/0751* (2013.01); *G06F 2201/86* (2013.01)

(56) References Cited

U.S. PATENT DOCUMENTS

| | | | | |
|---|---|---|---|---|
| 2012/0194817 | A1* | 8/2012 | Funayama | ............. G01N 21/31 356/402 |
| 2014/0172227 | A1* | 6/2014 | Tsukidate | ............ G06F 11/0739 701/29.2 |
| 2017/0259761 | A1 | 9/2017 | Ben Noon et al. | |
| 2018/0295147 | A1* | 10/2018 | Haga | ..................... G07C 5/0808 |
| 2018/0316584 | A1* | 11/2018 | Ujiie | ..................... H04W 12/61 |
| 2019/0138423 | A1* | 5/2019 | Agerstam | ............ H04W 12/009 |
| 2019/0217869 | A1* | 7/2019 | Takeuchi | ............ G06F 11/3013 |
| 2019/0245867 | A1 | 8/2019 | Ben David et al. | |
| 2019/0324422 | A1* | 10/2019 | Capodanno | ............. G06F 11/07 |
| 2020/0053112 | A1 | 2/2020 | Torisaki et al. | |
| 2020/0145251 | A1* | 5/2020 | Hass | .................. G06F 11/0736 |
| 2020/0334554 | A1* | 10/2020 | Takahashi | ........... G06F 11/3065 |
| 2021/0084464 | A1* | 3/2021 | Watanabe | ............... H04L 12/40 |
| 2021/0261003 | A1* | 8/2021 | Zang | .................. G05B 23/0275 |
| 2022/0164248 | A1* | 5/2022 | Stein | ........................ G06N 3/08 |
| 2022/0261304 | A1* | 8/2022 | Takeuchi | ............ G06F 11/0739 |

FOREIGN PATENT DOCUMENTS

| | | | | |
|---|---|---|---|---|
| JP | 2017-126978 | A | | 7/2017 |
| JP | 2019-009617 | A | | 1/2019 |
| JP | 2021048495 | A | * 3/2021 | ............. G06N 5/025 |
| WO | 2019/142741 | A1 | | 7/2019 |

OTHER PUBLICATIONS

Written Opinion of the International Searching Authority (WO/ISA) issued in International Bureau of WIPO Patent Application No. PCT/JP2020/039797, dated Dec. 22, 2020, together with an English translation.

German Office Action dated Feb. 2, 2023 issued for German patent application No. 112020005622.8, together with an English translation.

* cited by examiner

| Detection Target | Local rule | Global rule |
|---|---|---|
| Acceleration | High | Low |
| Body | Low | High |
| Steering | High | Low |
| Period | High | Low |

| # | Rule | Priority | Process |
|---|---|---|---|
| 1 | Local rule | High | Invalidation process |
| 2 | | High (Initial rule) | Alert process |
| 3 | | Low | Alert process |
| 4 | Global rule | High | Invalidation process |
| 5 | | Low | Alert process |

INFORMATION PROCESSING DEVICE AND INFORMATION PROCESSING METHOD

CROSS REFERENCE TO RELATED APPLICATIONS

This is a continuation application of PCT International Application No. PCT/JP2020/039797 filed on Oct. 22, 2020, designating the United States of America, which is based on and claims priority of Japanese Patent Application No. 2019-204314 filed on Nov. 11, 2019.

FIELD

The present disclosure relates to an information processing device and an information processing method.

BACKGROUND

An anomaly detecting device that detects unauthorized communication in an in-vehicle network is disclosed. An anomaly detecting device described in Patent Literature (PTL) 1 performs anomaly detection processing while switching rules according to a driving condition.

CITATION LIST

Patent Literature

PTL 1 Japanese Unexamined Patent Application Publication No. 2019-9617

SUMMARY

However, the anomaly detecting device according to PTL 1 can be improved upon.

In view of this, the present disclosure provides an information processing device capable of improving upon the above related art.

An information processing device according to an aspect of the present disclosure is an information processing device that detects an anomaly in an in-vehicle network provided in a vehicle, and includes: an individual rule storage in which at least an individual rule is stored, the individual rule being a rule generated for the vehicle; an integrated rule storage in which an integrated rule is stored, the integrated rule being a rule generated for a plurality of vehicles including the vehicle; and a processing unit that performs, using a rule stored in at least one of the individual rule storage or the integrated rule storage, an anomaly detection process on a frame transmitted on the in-vehicle network.

It should be noted that these generic or specific aspects may be implemented as a system, a method, an integrated circuit, a computer program, or a computer-readable recording medium such as a CD-ROM, or as any combination of a system, a method, an integrated circuit, a computer program, and a recording medium.

The information processing device according to the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

Figure 1:
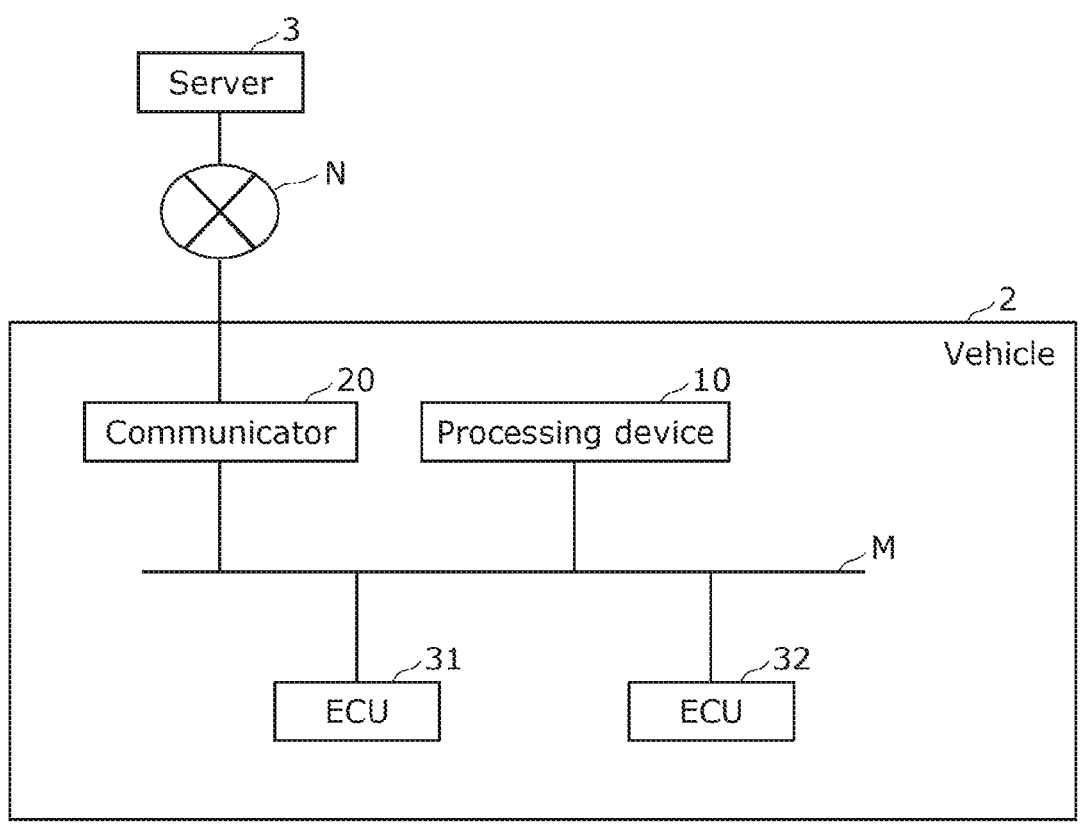
FIG. 1 is a schematic diagram illustrating a configuration of a processing system according to Embodiment 1.

DESCRIPTION OF EMBODIMENTS (Underlying Knowledge Forming Basis of the Present Disclosure)

In the anomaly detection device according to PTL 1, there is a problem that it is not always possible to accurately perform rule-based anomaly detection.

In view of this, an object of the present disclosure is to provide an information processing device that improves the accuracy of rule-based anomaly detection.

An information processing device according to an aspect of the present disclosure is an information processing device that detects an anomaly in an in-vehicle network provided in a vehicle, and includes: an individual rule storage in which at least an individual rule is stored, the individual rule being a rule generated for the vehicle; an integrated rule storage in which an integrated rule is stored, the integrated rule being a rule generated for a plurality of vehicles including the vehicle; and a processing unit that performs, using a rule stored in at least one of the individual rule storage or the integrated rule storage, an anomaly detection process on a frame transmitted on the in-vehicle network.

According to the above-described aspect, the information processing device performs a rule-based anomaly detection process using the individual rule storage and the integrated rule storage. The possibility that an anomaly detection process having high accuracy of anomaly detection can be performed is therefore increased compared to a case where only one of the individual rule storage and the integrated rule storage is used. In this manner, there is a possibility that the information processing device is thus capable of improving accuracy of rule-based anomaly detection.

For example, when a rule is stored in the individual rule storage and a rule is stored in the integrated rule storage, the processing unit may perform the anomaly detection process, using the rule stored in one storage out of the individual rule storage and the integrated rule storage, the one storage being predetermined according to a detection target.

According to the above-described aspect, in a case where a rule is stored in the individual rule storage and a rule is stored in the integrated rule storage, the information processing device selectively uses appropriate one rule from the rules according to the detection target and performs the anomaly detection process. Therefore, the possibility that the information processing device can perform an anomaly detection process having high accuracy of anomaly detection is further increased. The information processing device is thus capable of improving accuracy of rule-based anomaly detection according to a detection target.

For example, an initial rule which is a predetermined rule regarding the vehicle may be further stored in the individual rule storage, and, even when a rule is stored in the individual rule storage and a rule is stored in the integrated rule storage, if the initial rule is stored in the individual rule storage, the processing unit may perform the anomaly detection process, using the integrated rule stored in the integrated rule storage.

According to the above-described aspect, the information processing device preferentially uses the integrated rule over the initial rule and performs the anomaly detection process. An initial rule is not a rule generated uniquely to the vehicle. The integrated rule is a rule generated for a plurality of vehicles including the vehicle. Accordingly, it can be considered that the integrated rule is more appropriate for the anomaly detection process in the vehicle than the initial rule. The information processing device is therefore capable of improving accuracy of rule-based anomaly detection by using an appropriate rule with characteristics of an initial rule and an integrated rule taken into account.

For example, when a rule is stored in only one of the individual rule storage and the integrated rule storage, the processing unit may perform the anomaly detection process using the rule which is stored.

According to the above-described aspect, the information processing device uses one of a rule in the individual rule storage and a rule in the integrated rule storage for the anomaly detection process. The possibility that a rule-based anomaly detection process can be performed is therefore increased compared to a case where only one of the individual rule storage and the integrated rule storage is used, in other words, a possibility that the rule-based anomaly detection process cannot be performed is decreased. The information processing device is thus capable of improving accuracy of rule-based anomaly detection.

For example, the processing unit may further perform an invalidation process of invalidating the frame in which an anomaly is detected in the anomaly detection process.

According to the above-described aspect, the information processing device can prevent a frame in which an anomaly is detected in the anomaly detection process from being received by other devices connected to the in-vehicle network. It is therefore possible to prevent in advance another device from receiving a frame in which an anomaly is detected and performing an inappropriate operation. The information processing device is thus capable of improving accuracy of rule-based anomaly detection while preventing an inappropriate operation by another device.

For example, the processing unit may further perform an alert process of outputting an alert for the frame in which an anomaly is detected in the anomaly detection process.

According to the above-described aspect, the information processing device can notify another device or a user that there is a frame in which an anomaly is detected in the anomaly detection process. This is expected to lead to an action against the frame, and handling not to detect a similar anomaly in the future can be performed. The information processing device is thus capable of improving accuracy of rule-based anomaly detection while preventing or reducing future occurrence of an anomaly.

For example, the processing unit may perform at least one process out of (i) an invalidation process of invalidating the frame in which an anomaly is detected in the anomaly detection process or (ii) an alert process of outputting an alert for the frame in which an anomaly is detected in the anomaly detection process, the at least one process being predetermined according to a detection target.

According to the above-described aspect, the information processing device can perform an appropriate one of the invalidation process and the alert process according to a detection target. This allows an action suitable for a result of the anomaly detection to be performed while the invalidation process and the alert process are selectively used according to a detection target. The information processing device is thus capable of improving accuracy of rule-based anomaly detection and performing an action after the detection appropriately.

For example, a plurality of rules each to be applied to the vehicle in a different one of situations may be stored in the individual rule storage. The vehicle may include a sensor that performs sensing inside or outside the vehicle. The processing unit may select one rule from among the plurality of rules stored in the individual rule storage, according to a result of sensing by the sensor, and perform the anomaly detection process using, as the individual rule, the one rule selected.

According to the above-described aspect, the information processing device performs the anomaly detection process using, as an individual rule, a rule selected from among the plurality of rules, the rule being suitable for a situation of a vehicle or a situation of a vicinity of the vehicle. It is therefore possible to further improve accuracy of the anomaly detection by using an individual rule suitable for a situation of a vehicle or a situation of a vicinity of the vehicle.

For example, a plurality of rules each to be applied to the vehicle in a different one of situations may be stored in the integrated rule storage. The vehicle may include a sensor that performs sensing inside or outside the vehicle. The processing unit may select one rule from among the plurality of rules stored in the integrated rule storage, according to a result of sensing by the sensor, and perform the anomaly detection process using, as the integrated rule, the one rule selected.

According to the above-described aspect, the information processing device performs the anomaly detection process using, as an integrated rule, a rule selected from among the plurality of rules, the rule being suitable for a situation of a vehicle or a situation of a vicinity of the vehicle. It is therefore possible to further improve accuracy of the anomaly detection by using an integrated rule suitable for a situation of a vehicle or a situation of a vicinity of the vehicle.

For example, the information processing device may further include an individual rule history storage in which the individual rule prior to updating is stored, when the individual rule stored in the individual rule storage is updated. When a predetermined condition is satisfied, the processing unit may copy the individual rule stored in the individual rule history storage into the individual rule storage, and perform the anomaly detection process after copying the individual rule.

According to the above-described aspect, the information processing device can restore an individual rule with an individual rule used in the past, that is, roll back the individual rule, before performing the anomaly detection, when the predetermined condition is satisfied. Therefore, if an individual rule becomes inappropriate, it is possible to restore a past, appropriate individual rule by determining the inappropriateness under a predetermined condition. The information processing device is thus capable of improving accuracy of rule-based anomaly detection by rolling back an individual rule when necessary.

For example, the information processing device may further include an integrated rule history storage in which the integrated rule prior to updating is stored, when the integrated rule stored in the integrated rule storage is updated. When a predetermined condition is satisfied, the processing unit may copy the integrated rule stored in the integrated rule history storage into the integrated rule storage, and perform the anomaly detection process after copying the integrated rule.

According to the above-described aspect, the information processing device can restore an integrated rule with an integrated rule used in the past, that is, roll back the integrated rule, before performing the anomaly detection, when the predetermined condition is satisfied. Therefore, if an integrated rule becomes inappropriate, it is possible to restore a past, appropriate integrated rule by determining the inappropriateness under a predetermined condition. The information processing device is thus capable of improving accuracy of rule-based anomaly detection by rolling back an integrated rule when necessary.

For example, an information processing method according to an aspect of the present disclosure is an information processing method executed by an information processing device that detects an anomaly in an in-vehicle network provided in a vehicle. Here, the information processing device includes: an individual rule storage in which at least an individual rule is stored, the individual rule being a rule generated for the vehicle; an integrated rule storage in which an integrated rule is stored, the integrated rule being a rule generated for a plurality of vehicles including the vehicle. The information processing method includes: obtaining a frame transmitted on the in-vehicle network; and performing, using a rule stored in at least one of the individual rule storage or the integrated rule storage, an anomaly detection process on the frame obtained.

According to the above-described aspect, the same advantageous effect as that of the above-described information processing device is produced.

It should be noted that these generic or specific aspects may be implemented as a system, a method, an integrated circuit, a computer program, or a computer-readable recording medium such as a CD-ROM, or as any combination of a system, a method, an integrated circuit, a computer program, and a recording medium.

Embodiments will be described in detail with reference to the drawings.

It should be noted that each of the subsequently described embodiments shows a generic or specific example of the present disclosure. Numerical values, shapes, materials, structural components, the arrangement and connection of the structural components, steps, and the processing order of the steps, etc., shown in each of the following embodiments are merely examples, and are therefore not intended to limit the scope of the present disclosure. Furthermore, among the structural components described in the following embodiments, structural components not recited in any one of the independent claims that indicate the broadest concepts are described as optional structural components.

Embodiment 1

In the present embodiment, an information processing device that improves accuracy of rule-based anomaly detection will be described. It should be noted that processing device 10 to be described later is an example of the information processing device.

FIG. 1 is a schematic diagram illustrating a configuration of a processing system according to the present embodiment.

As illustrated in FIG. 1, the processing system includes vehicle 2 and server 3. Vehicle 2 and server 3 are connected to one another via network N so that vehicle 2 and server 10 can communicate with one another. Network N is an external network for vehicle 2 and includes a mobile phone carrier network or the Internet.

Vehicle 2 is a vehicle, an automobile for example, that includes processing device 10, communicator 20, detector 21, and one or more electronic control units (ECUs) 31, 32, and the like. Processing device 10, communicator 20, and one or more electronic control units (ECUs) 31, 32, and the like are connected via in-vehicle network M so as to be able to communicate with one another.

One or more ECUs 31, 32, and the like, are electronic control devices that control controlled objects such as an engine, a steering wheel, brakes, and windows. One or more ECUs 31, 32, and the like are connected to their respective controlled objects and control their respective controlled objects.

Communicator 20 is a communication device that connects in-vehicle network M and network N. Communicator 20 includes a communication interface compatible with in-vehicle network M and a communication interface compatible with network N and transfer communication frames (also simply referred to as frames) from one to another.

Aside from one or more ECUs 31, 32, and the like, an information terminal or a diagnostic device can be connected to in-vehicle network M via a port (not illustrated).

A standard of in-vehicle network M is, for example, Controller Area Network (CAN), and the description will be given of a case where CAN is used; additionally, CAN with Flexible Data rate (CAN-FD), Local Interconnect Network (LIN), Media Oriented Systems Transport (MOST®), FlexRay®, Ethernet®, and the like can be used.

Processing device 10 is a device that detects unauthorized communication that can be performed in in-vehicle network M as an anomaly and performs processing for the anomaly. Processing device 10 is connected to in-vehicle network M by communication IF.

In vehicle 2, there is a possibility that unauthorized communication is performed from the information terminal or the diagnostic device via a port (not illustrated) provided in in-vehicle network M or communicator 20. When unauthorized communication is performed, unauthorized control of, for example, an engine, a steering wheel, a brake, a window, or the like may be performed, or an unauthorized program may be sent to ECU 31 or the like, causing a further anomaly to occur. In view of this, processing device 10 treats unauthorized communication in in-vehicle network M as an anomaly and uses a rule to detect the unauthorized communication and processes the unauthorized communication appropriately.

Server 3 is a server that performs information processing for controlling vehicle 2. Server 3 is connected to vehicle 2 via network N. It should be noted that server 3 is presumed to be connected to other vehicles (not illustrated) via network N. Server 3 generates a detection rule for detecting unauthorized communication in vehicle 2 and transmits the rule to vehicle 2 via network N.

Processing device 10 will be described in detail below.

Figure 2:
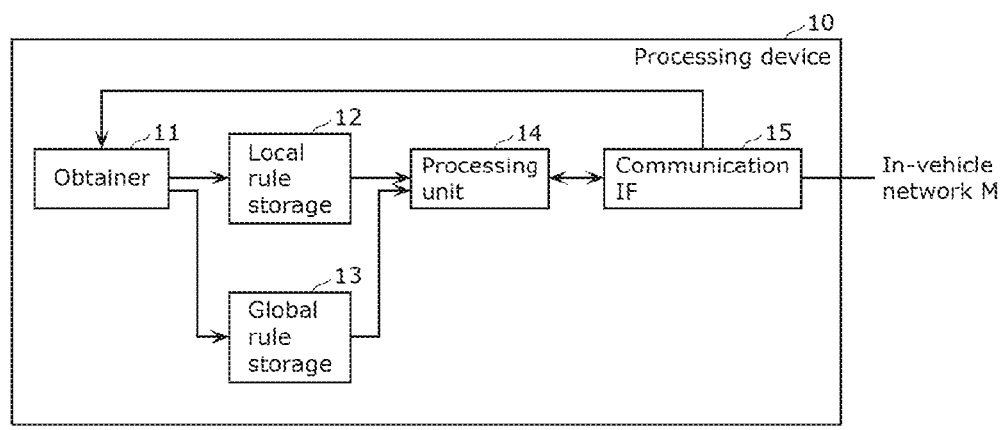
FIG. 2 is a block diagram illustrating a configuration of a processing device according to Embodiment 1.

FIG. 2 is a block diagram illustrating a configuration of processing device 10 according to the present embodiment.

As illustrated in FIG. 2, processing device 10 includes obtainer 11, local rule storage 12, global rule storage 13, processing unit 14, and communication IF (interface) 15.

Obtainer 11 is a processing unit that obtains a local rule and a global rule. Obtainer 11 stores the local rule obtained in local rule storage 12 and stores the global rule obtained in global rule storage 13. The local rule and the global rule are each a rule for detecting an anomaly in in-vehicle network M and will be described as follows.

The local rule includes an individual rule and an initial rule. The individual rule is a rule generated for vehicle 2 being an individual vehicle and includes a condition to be satisfied by content or timings of communications of the ECUs. The individual rule is obtained in such a way that, for example, obtainer 11 obtains content or timings of communications of the ECUs in a normal condition by analyzing frames that are transmitted on in-vehicle network M and obtained with communication IF 15, and generates a condition to be satisfied by the content or timings of the communications of the ECUs in a form of a rule. Aside from the above, various methods can be employed as a method for generating an individual rule.

The initial rule is a rule predetermined as a rule applied to in-vehicle network M of vehicle 2; for example, the initial rule is a rule that has already been obtained by obtainer 11 at factory shipment of vehicle 2. The initial rule is a rule generated for, for example, a vehicle model to which vehicle 2 belongs.

The global rule is a rule generated for a plurality of vehicles including vehicle 2 and includes a condition to be satisfied by content or timings of communications of the ECUs. The global rule will be also referred to as an integrated rule. The integrated rule is a rule obtained in such a way that, for example, server 3 obtains content or timings of communications of the ECUs in a normal condition based on information regarding frames that are transmitted on in-vehicle networks M of the plurality of vehicles and are collected from the plurality of vehicles, and generates a condition to be satisfied by the content or timings of the communications of the ECUs in a form of a rule. Obtainer 11 obtains the integrated rule generated by server 3 in the way described above, via communication IF 15. Aside from the above, various methods can be employed as a method for generating an integrated rule.

It should be noted that here is described, as an example, a case where the local rule and the global rule are each a whitelist that is a list stipulating a condition to be satisfied by a normal operation, but a blacklist that is a list stipulating a condition to be satisfied by an anomalous operation can be used.

Local rule storage 12 is a storage device in which a local rule is stored. Local rule storage 12 is provided in a form of a memory or a storage device (hard disk drive (HDD) or solid state drive (SSD), etc.). A local rule is stored in local rule storage 12 by obtainer 11, and the local rule stored is read by processing unit 14. Local rule storage 12 will be also referred to as an individual rule storage.

Global rule storage 13 is a storage device in which a global rule is stored. Global rule storage 13 is provided in a form of a memory or a storage device. A global rule is stored in global rule storage 13 by obtainer 11, and the global rule stored is read by processing unit 14. Global rule storage 13 will be also referred to as an integrated rule storage.

Processing unit 14 performs an anomaly detection process on a frame transmitted on in-vehicle network M. Specifically, processing unit 14 obtains, via communication IF 15, a frame transmitted on in-vehicle network M and performs the anomaly detection process on the frame obtained, using a rule stored in at least one of local rule storage 12 or global rule storage 13. There are various methods about how processing unit 14 selects a rule from between a rule stored in local rule storage 12 and a rule stored in global rule storage 13 to use for the anomaly detection process.

For example, when a rule is stored in local rule storage 12 and a rule is stored in global rule storage 13, processing unit 14 performs the anomaly detection process, using a rule stored in one storage out of local rule storage 12 and global rule storage 13; the one storage is predetermined according to a detection target.

For example, even when a rule is stored in local rule storage 12 and a rule is stored in global rule storage 13, if an initial rule is stored in local rule storage 12, processing unit 14 performs the anomaly detection process, using an integrated rule stored in global rule storage 13.

For example, when a rule is stored in only one of local rule storage 12 and global rule storage 13, processing unit 14 performs the anomaly detection process using the rule which is stored.

Furthermore, when an anomaly is detected in the anomaly detection process, processing unit 14 may further perform an invalidation process or an alert process. The invalidation process is a process of invalidating a frame in which an anomaly is detected, in other words, a process of preventing other ECUs connected in in-vehicle network M from receiving the frame. For example, a method that can be employed as the invalidation process is a method in which processing unit 14 performs the anomaly detection process while receiving a frame, and when detecting an anomaly in the anomaly detection process, processing unit 14 causes another signal to collide with the frame being received using communication IF 15 to prevent the other devices from receiving the frame.

The alert process is a process of outputting an alert for a frame in which an anomaly is detected. The alert may be provided to a user who visually recognizes information that is transmitted to server 3 and presented by server 3 or may be presented by a car navigation system, an in-vehicle infotainment (IVI) system, or other systems so that the alert is visually recognized by a driver in vehicle 2.

It should be noted that processing unit 14 may be configured to perform at least one process of the invalidation process and the alert process; the at least one process is predetermined according to a detection target. Which of the invalidation process and the alert process processing unit 14 is to perform will be described later in detail.

Communication IF 15 is a communication interface device connected to in-vehicle network M. Communication IF 15 receives a frame transmitted on in-vehicle network M and provides the frame to processing unit 14. Furthermore, communication IF 15 receives a local rule from server 3 via in-vehicle network M and provides the local rule to obtainer 11.

Figures 3, 4:
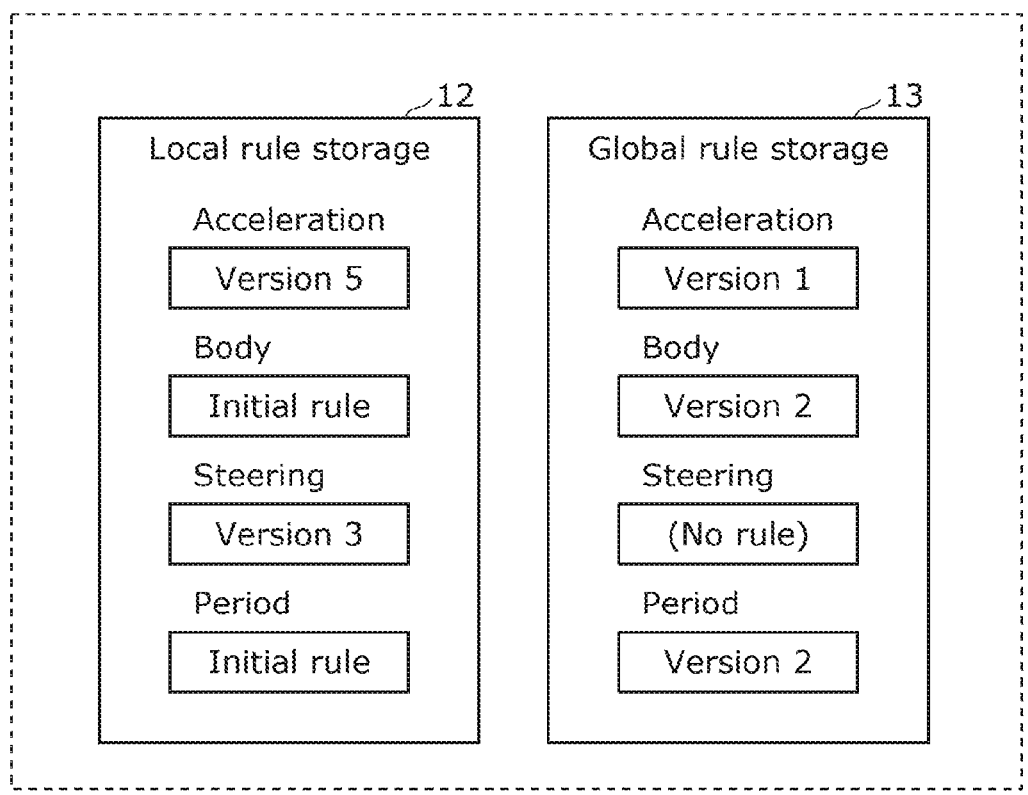
FIG. 3 is an explanatory diagram of rules stored in a local rule storage and a global rule storage according to Embodiment 1.
FIG. 4 is an explanatory diagram illustrating an example of a priority table that shows a priority for each detection target of a rule according to Embodiment 1.

FIG. 3 is an explanatory diagram of rules stored in local rule storage 12 and global rule storage 13 according to the present embodiment.

As illustrated in FIG. 3, a local rule is stored in local rule storage 12 for each detection target.

In an example illustrated in FIG. 3, the detection targets include "acceleration", "body", "steering", and "period".

A target of detection for the detection target "acceleration" is information indicating control or a state regarding an acceleration of vehicle 2; specifically, the target is information indicating control or a state regarding a magnitude or an amount of change in acceleration, regarding a timing of the acceleration, or the like.

A target of detection for the detection target "body" is information indicating control or a state regarding a body of vehicle 2; specifically, the target is information indicating control or a state regarding a lamp, a door, or meters.

A target of detection for the detection target "steering" is information indicating control or a state regarding steering of vehicle 2; specifically, the target is information indicating control or a state regarding a steering angle of a steering wheel or regarding a motor that controls a steering mechanism.

A target of detection for the detection target "period" is information indicating control or a state regarding a period of frames transmitted by the ECUs of vehicle 2.

A version of a local rule for a detection target being "acceleration" is 5. A local rule for a detection target being "body" is an initial rule. A version of a local rule for a detection target being "steering" is 3. A local rule for a detection target being "period" is an initial rule.

As illustrated in FIG. 3, a global rule is stored in global rule storage 13 for each detection target. The detection targets are the same as those for local rule storage 12.

A version of a global rule for a detection target being "acceleration" is 1. A version of a local rule for a detection target being "body" is 2. There is no local rule (in other words, no local rule is stored) for a detection target being "steering". A version of a local rule for a detection target being "period" is 2.

Local rule storage 12 and global rule storage 13 are referred to by processing unit 14, and rules stored in local rule storage 12 and global rule storage 13 are used for the anomaly detection process by processing unit 14.

FIG. 4 is an explanatory diagram illustrating an example of a priority table that shows a priority for each detection target of a rule according to the present embodiment.

Here, for each detection target, rules are each given a priority as to whether a local rule or a global rule is to be applied preferentially. The priorities may be determined in any way. For example, the priorities may be determined such that a local rule is to be applied preferentially for a detection target of which variations based on individual differences among vehicles or individual differences among drivers who drive the vehicles are relatively large (e.g., acceleration, steering, or period). In addition, the priorities may be also determined such that a global rule is to be applied preferentially for a detection target of which variations based on individual differences among vehicles are relatively small (e.g., body). Detection targets of which variations based on individual differences among vehicles are relatively small can include an operating procedure that is carried out on a vehicle or a startup procedure for starting a predetermined function of a vehicle.

In the priority table illustrated in FIG. 4, priorities are expressed as binarized values "high" and "low", as an example.

The priority table shows that, for detection targets "acceleration", "steering", and "period", a priority of applying a local rule is high, and a priority of applying a global rule is low.

The priority table also shows that, for a detection target "body", a priority of applying a local rule is low, and a priority of applying a global rule is high.

Figure 5:
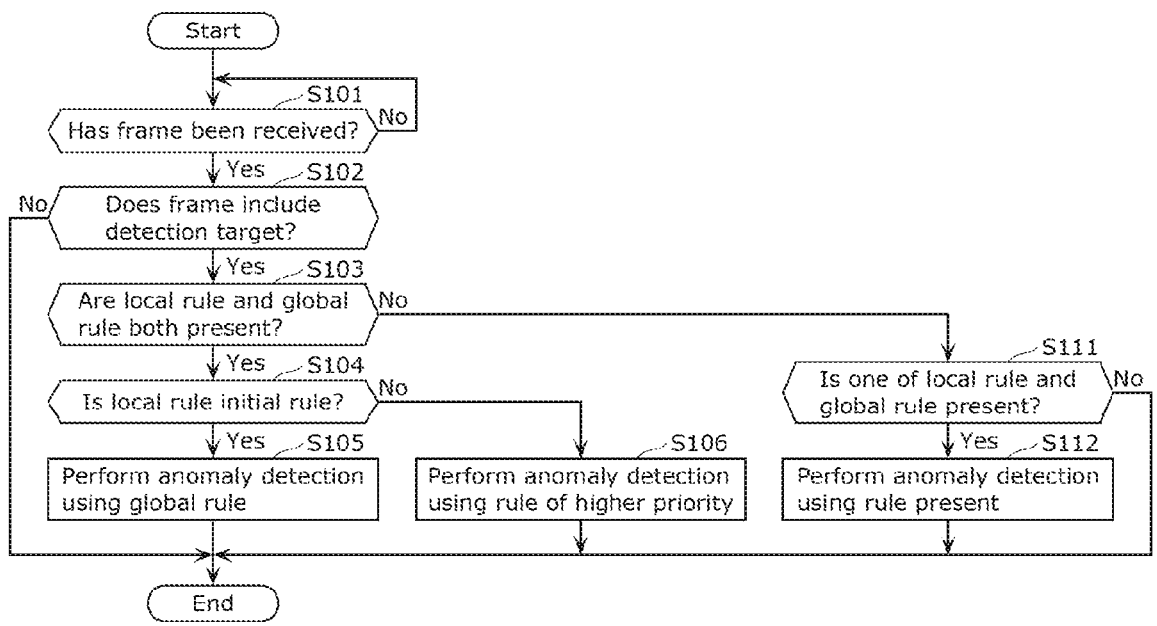
FIG. 5 is a flowchart illustrating processing by the processing device according to Embodiment 1.

FIG. 5 is a flowchart illustrating processing by processing device 10 according to the present embodiment.

In step S101, processing unit 14 determines whether a frame has been received from communication IF 15. If a frame has been received (YES in step S101), the processing proceeds to step S102, and if not (NO in step S101), step S101 is executed again. That is, processing unit 14 waits in step S101 until a frame is received.

In step S102, processing unit 14 determines whether the frame received in step S101 includes a detection target. Here, processing unit 14 is supposed to be assigned in advance with a detection target; for example, processing unit 14 is assumed here to be assigned with "acceleration" as the detection target. In this case, processing unit 14 determines whether the frame received in step S101 includes control information regarding "acceleration". If processing unit 14 determines that the frame received in step S101 includes the detection target (Yes in step S102), the processing proceeds to step S103, and if not (NO in step S102), a series of steps illustrated in FIG. 5 is ended.

In step S103, processing unit 14 determines whether a local rule and a global rule are both present for the detection target. If processing unit 14 determines that both are present (YES in step S103), the processing proceeds to step S104, and if not (NO in step S103), the processing proceeds to step S111.

In step S104, processing unit 14 determines whether the local rule is an initial rule. If processing unit 14 determines that the local rule is an initial rule (YES in step S104), the processing proceeds to step S105, and if not (NO in step S104), the processing proceeds to step S106.

In step S105, processing unit 14 performs the anomaly detection process on the frame received in step S101, using the global rule stored in global rule storage 13. After step S105 is ended, the series of steps illustrated in FIG. 5 is ended.

In step S106, processing unit 14 performs the anomaly detection process on the frame received in step S101, using one rule of the global rule and the local rule; the one rule is of a higher priority. At this time, processing unit 14 refers to the priority table to determine which of the global rule and the local rule is assigned with a higher priority, and uses one rule of the global rule and the local rule that; the one rule is assigned with the higher priority, for the anomaly detection process. After step S106 is ended, the series of steps illustrated in FIG. 5 is ended.

In step S111, processing unit 14 determines whether any one of a local rule and a global rule is present for the detection target. If processing unit 14 determines that the any one is present (YES in step S111), the processing proceeds to step S112, and if not (NO in step S111), the series of steps illustrated in FIG. 5 is ended.

In step S112, processing unit 14 performs the anomaly detection process on the frame received in step S101, using a present one of the global rule and the local rule. After step S112 is ended, the series of steps illustrated in FIG. 5 is ended.

Through the series of steps illustrated in FIG. 5, processing device 10 can improve accuracy of rule-based anomaly detection.

Hereinafter, a specific case about rules used for anomaly detection by processing unit 14 will be described.

Figure 6:
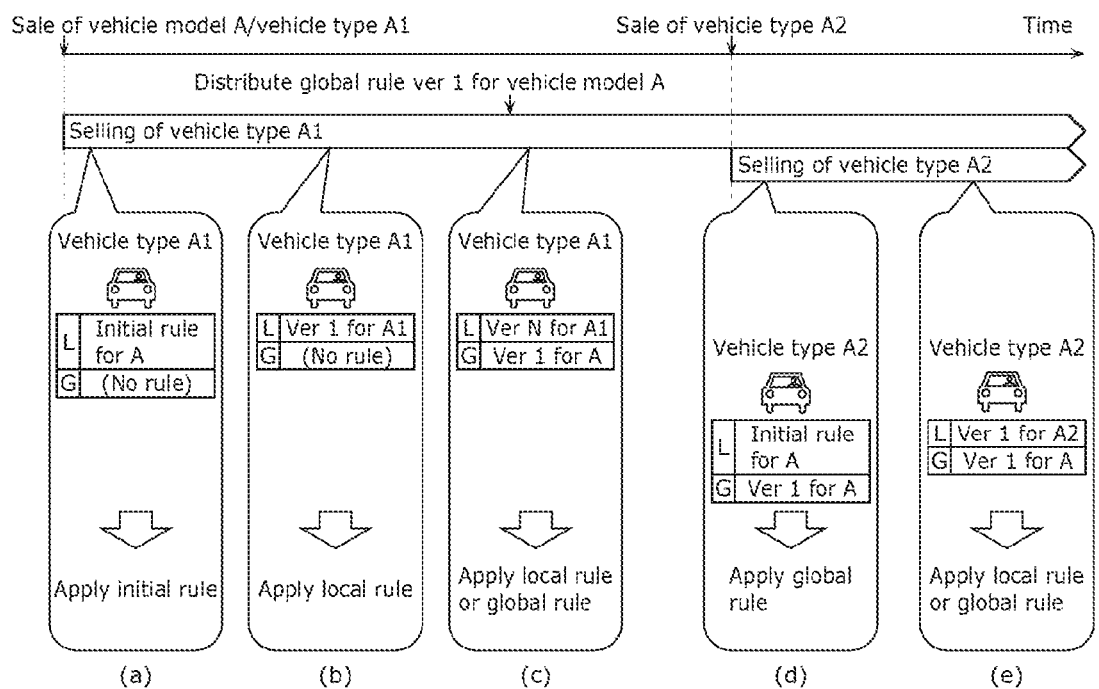
FIG. 6 is an explanatory diagram illustrating, on a time series basis, an example of rules used by the processing device according to Embodiment 1.

FIG. 6 is an explanatory diagram illustrating an example of rules used by processing device 10 according to the present embodiment, on a time series basis.

In this example, which of a local rule or a global rule processing unit 14 selects for the anomaly detection as time progresses from sale of vehicle model A is started will be described specifically. Let vehicle type A1 denote a vehicle type of vehicle model A at a time point when the sale of vehicle model A is started, and assume that sale of vehicle type A2 is started after the sale of vehicle model A has been started.

In the figure, "L" indicates a rule stored in local rule storage 12, and "G" indicates a rule stored in global rule storage 13. In FIG. 6, (a) indicates a time point when the sale of vehicle type A1 of vehicle model A is started. At the time point when the sale of vehicle type A1 is started, an initial rule for vehicle model A has been stored in local rule storage 12, and no rule is stored in global rule storage 13.

In this case, processing unit 14 performs the anomaly detection process using the initial rule stored in local rule storage 12. This corresponds to a progression from step S103 in the flowchart illustrated in FIG. 5 in an order of No in step S103, YES in step S111, and step S112.

In FIG. 6, (b) indicates a time point when a time elapses from the start of the sale of vehicle model A (vehicle type A1). At this time point, a local rule for vehicle type A1 has been generated by obtainer 11 and stored in local rule storage 12. No rule is stored in global rule storage 13.

In this case, processing unit 14 performs the anomaly detection process using the local rule stored in local rule storage 12. This corresponds to a progression from step S103 in the flowchart illustrated in FIG. 5 in an order of No in step S103, YES in step S111, and step S112.

In FIG. 6, (c) indicates a time point when a time further elapses from the start of the sale of vehicle model A (vehicle type A1). At this time point, a rule "Version N for vehicle type A1", which is a local rule for vehicle type A1, has been generated by obtainer 11 and stored in local rule storage 12. In addition, a rule "Version 1 for vehicle model A", which is a global rule for vehicle model A, has been generated by obtainer 11 and stored in global rule storage 13.

In this case, processing unit 14 performs the anomaly detection process using one rule of the local rule stored in local rule storage 12 and the global rule stored in global rule storage 13; the one rule is of a higher priority. This corresponds to a progression from step S103 in the flowchart illustrated in FIG. 5 in an order of YES in step S103, NO in step S104, and step S106.

In FIG. 6, (d) indicates a time point when sale of vehicle type A2 of vehicle model A is started. At the time point when the sale of vehicle type A2 is started, the initial rule for vehicle model A has been stored in local rule storage 12, and the rule "Version 1 for vehicle model A", which is a global rule for vehicle model A, has been stored in global rule storage 13.

In this case, processing unit 14 performs the anomaly detection process using the global rule stored in global rule storage 13. This corresponds to a progression from step S103 in the flowchart illustrated in FIG. 5 in an order of YES in step S103, YES in step S104, and step S105.

In FIG. 6, (e) indicates a time point when a time elapses from the start of the sale of vehicle type A2 of vehicle model A. At this time point, a rule "Version 1 for vehicle type A2", which is a local rule for vehicle type A2, has been generated by obtainer 11 and stored in local rule storage 12. In addition, "Version 1 for vehicle model A" is stored in global rule storage 13, as in (d) in FIG. 6.

In this case, processing unit 14 performs the anomaly detection process using one rule of the local rule stored in local rule storage 12 and the global rule stored in global rule storage 13, the one rule being of a higher priority. This corresponds to a progression from step S103 in the flowchart illustrated in FIG. 5 in an order of YES in step S103, NO in step S104, and step S106.

In this way, in a case where neither individual rule nor integrated rule for vehicle type A1 has been created yet, processing device 10 performs the anomaly detection process using an initial rule, and in a case where an individual rule or an integrated rule for vehicle type A1 has been created, processing device 10 performs the anomaly detection process using one of the individual rule and the integrated rule according to presence or absence of one of the rules or to priorities of the rules.

In the above-described way, processing device 10 can appropriately select a rule from between a local rule and a global rule and use the selected rule for the anomaly detection.

Figures 7, 8:
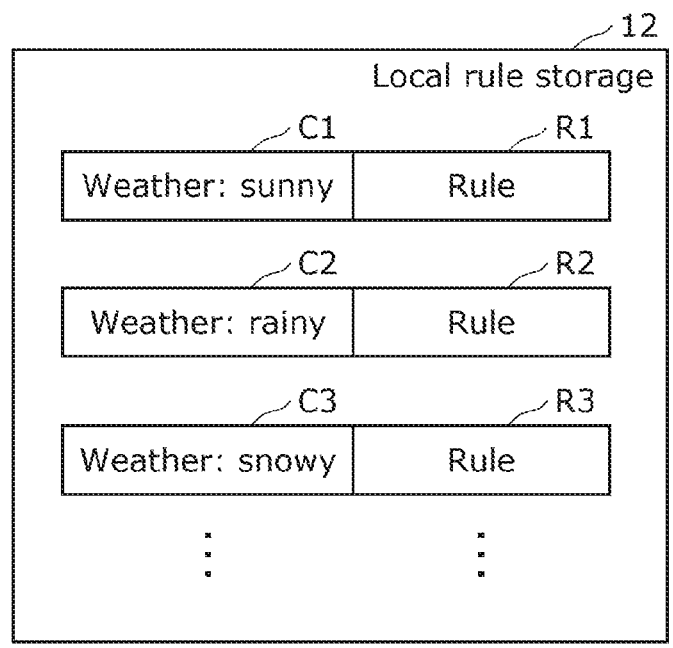
FIG. 7 is an explanatory diagram illustrating an example of a table showing processes to be executed by the processing device according to Embodiment 1.
FIG. 8 is an explanatory diagram illustrating a case where a plurality of rules are stored in the local rule storage according to Embodiment 1.

FIG. 7 is an explanatory diagram illustrating an example of a table showing processes to be executed by processing device 10 according to the present embodiment. The table illustrated in FIG. 7 shows processes that processing unit 14 additionally performs when an anomaly is detected in a frame in the anomaly detection process.

The table illustrated in FIG. 7 shows distinction between a local rule and a global rule to be used for the anomaly detection process and shows which of the invalidation process and the alert process is to be performed by processing unit 14 according to priorities of the rules.

For example, Entry #1 indicates that processing unit 14 detects an anomaly in the anomaly detection process using a local rule and performs the invalidation process when a priority of the local rule is "high".

For example, Entry #2 indicates that processing unit 14 detects an anomaly in the anomaly detection process using an initial rule as a local rule and performs the alert process when a priority of the local rule is "high".

For example, Entry #3 indicates that processing unit 14 detects an anomaly in the anomaly detection process using a local rule and performs the alert process when a priority of the local rule is "low".

For example, Entry #4 indicates that processing unit 14 detects an anomaly in the anomaly detection process using a global rule and performs the invalidation process when a priority of the global rule is "high".

For example, Entry #5 indicates that processing unit 14 detects an anomaly in the anomaly detection process using a global rule and performs the alert process when a priority of the global rule is "low". It should be noted that local rule storage 12 and global rule storage 13 each may include a plurality of rules. Furthermore, processing unit 14 may be configured to select one rule from among the plurality of rules stored in local rule storage 12 or global rule storage 13 and use the selected one rule for the anomaly detection process.

Specifically, a plurality of rules each to be applied to vehicle 2 in a different one of situations may be stored in local rule storage 12, and vehicle 2 may include a sensor that performs sensing inside or outside vehicle 2. In this case, processing unit 14 may select one rule from among the plurality of rules stored in local rule storage 12, according to a result of sensing by the sensor, and performs the anomaly detection process using, as the individual rule, the one rule selected.

Likewise, a plurality of rules each to be applied to vehicle 2 in a different one of situations may be stored in global rule storage 13, and vehicle 2 may include a sensor that performs sensing inside or outside vehicle 2. In this case, processing unit 14 may select one rule from among the plurality of rules stored in global rule storage 13, according to a result of sensing by the sensor, and performs the anomaly detection process using, as the integrated rule, the one rule selected.

Hereinafter, processing in which processing unit 14 selects one rule from among a plurality of rules and uses the selected one rule for the anomaly detection process will be described with a case of local rule storage 12 and an individual rule or an initial rule taken as an example. It should be noted that the same holds for a case of global rule storage 13 and an integrated rule, and therefore, detailed description of the case will be omitted.

FIG. 8 is an explanatory diagram illustrating a case where a plurality of rules are stored in local rule storage 12 according to the present embodiment.

In local rule storage 12 illustrated in FIG. 8, a plurality of rules R1, R2, R3, . . . are stored. The plurality of rules R1 and the like are associated with conditions C1, C2, C3, . . . .

In a case where a plurality of rules are stored in local rule storage 12, processing unit 14 selects, from among the plurality of rules, a rule associated with a condition satisfied and uses, for the anomaly detection process, the rule selected.

The plurality of rules are, for example, a plurality of rules including rules each of which is determined for a type of weather. More specifically, condition C1 is a condition that "the weather is sunny", condition C2 is a condition that "the weather is rainy", and condition C3 is a condition that "the weather is snowy".

Processing unit 14 uses a sensor value obtained by a sensor (not illustrated) included in vehicle 2, an operating state of a wiper included in vehicle 2, weather information available from a server on the Internet, and the like to obtain how the ambient weather of vehicle 2 is. Processing unit 14 then determines whether condition C1 or the like stored in local rule storage 12 is satisfied, selects a rule associated with condition C1 or the like satisfied, and performs the anomaly detection process.

It should be noted that, as the plurality of rules, a plurality of rules including a rule determined for each area can be employed. More specifically, as a condition, a condition indicating an area where vehicle 2 is currently located, such as "Hokkaido", "Okinawa", and "Kansai region", can be employed. Processing unit 14 uses, as the sensor value, a result of detecting a position using the global positioning system (GPS), selects a rule from among the plurality of rules, and performs the anomaly detection process.

Furthermore, as the plurality of rules, a plurality of rules including a rule determined for each driver can be employed. More specifically, as a condition, a condition indicating an identifier of a driver, such as driver A, driver B, and driver C, can be employed. Processing unit 14 identifies a driver from a result of detecting a weight of the driver using a weight sensor or a result of recognition from an image taken with a camera, uses a result of the identification as the sensor value, selects a rule from among the plurality of rules, and performs the anomaly detection process.

It should be noted that, in a case where a rule in local rule storage 12 or global rule storage 13 is updated, the rule prior to the updating may be held, and the rule held may be copied into local rule storage 12 or global rule storage 13 when a predetermined condition is satisfied. That is, a rule in local rule storage 12 or global rule storage 13 may be controlled so as to be rolled back.

Specifically, processing device 10 may include a local rule history storage in which an individual rule prior to updating is stored, when the individual rule stored in local rule storage 12 is updated. In this case, when a predetermined condition is satisfied, processing unit 14 may copy an individual rule stored in the local rule history storage into local rule storage 12 and perform the anomaly detection process after copying the individual rule.

Likewise, processing device 10 may further include a global rule history storage in which an integrated rule prior to updating is stored, when the integrated rule stored in global rule storage 13 is updated. In this case, when a predetermined condition is satisfied, processing unit 14 may copy an integrated rule stored in the global rule history storage into global rule storage 13 and perform the anomaly detection process after copying the integrated rule.

Hereinafter, a rollback process will be described with a case of local rule storage 12 and an individual rule or an initial rule taken as an example. It should be noted that the same holds for a case of global rule storage 13 and an integrated rule, and therefore, detailed description of the case will be omitted.

Figure 9:
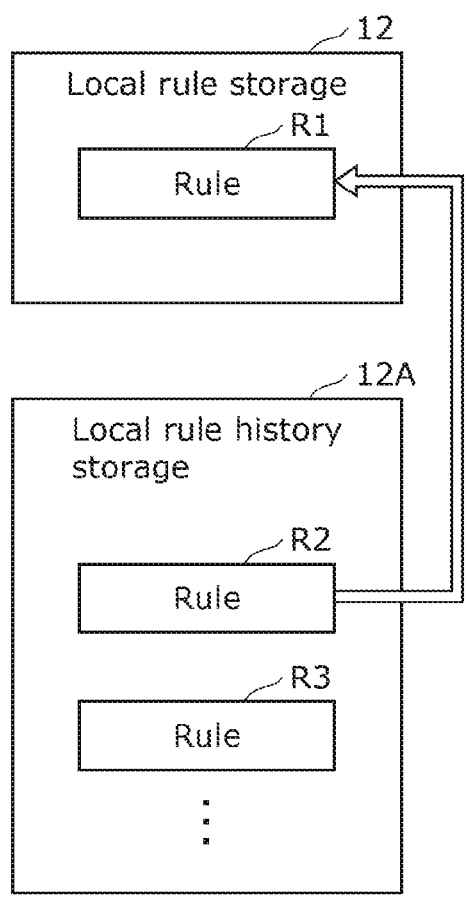
FIG. 9 is an explanatory diagram illustrating a case where a history of rules is stored in the local rule storage according to Embodiment 1.

FIG. 9 is an explanatory diagram illustrating a case where a history of rules is stored in local rule storage 12 according to the present embodiment.

In local rule storage 12 illustrated in FIG. 9, rule R1 is stored. In local rule history storage 12A, a plurality of rules R2 and R3 are stored.

Rules R2 and R3 are rules that are stored in local rule storage 12 in the past and have been stored in local rule history storage 12A when rules stored in local rule storage 12 are updated.

In a state illustrated in FIG. 9, processing unit 14 performs the anomaly detection process using rule R1. In addition, processing unit 14 repeatedly determines whether rule R1 stored in local rule storage 12 is an inappropriate rule.

In this determination, if processing unit 14 determines that rule R1 no longer satisfies the predetermined condition, processing unit 14 copies one of the rules stored in local rule history storage 12A, for example, rule R2, into local rule storage 12. Processing unit 14 is supposed to thereafter perform the anomaly detection process using rule R2.

It should be noted that which of the rules stored in local rule history storage 12A is selected may be optional, or a regulation may be provided for the selection. For example, in a case where there are a plurality of rules satisfying the predetermined condition, a newest rule of the plurality of rules may be selected.

In this way, processing unit 14 can restore a past rule when an inappropriate rule is stored in local rule storage 12.

In the above-described way, processing device 10 in the present embodiment performs a rule-based anomaly detection process using an individual rule storage and an integrated rule storage. The possibility that an anomaly detection process having high accuracy of anomaly detection can be performed is therefore increased compared to a case where only one of the individual rule storage and the integrated rule storage is used. The information processing device is thus capable of improving accuracy of rule-based anomaly detection.

In a case where a rule is stored in an individual rule storage and a rule is stored in an integrated rule storage, the information processing device selectively uses an appropriate one rule from the rules according to a detection target and performs the anomaly detection process. Therefore, the possibility that the information processing device can perform an anomaly detection process having high accuracy of anomaly detection is further increased. The information processing device is thus capable of improving accuracy of rule-based anomaly detection according to a detection target.

The information processing device preferentially uses an integrated rule over an initial rule and performs the anomaly detection process. An initial rule is not a rule generated uniquely to the vehicle. The integrated rule is a rule generated for a plurality of vehicles including the vehicle. Accordingly, it can be considered that the integrated rule is more appropriate for the anomaly detection process in the vehicle than the initial rule. The information processing device is therefore capable of improving accuracy of rule-based anomaly detection by using an appropriate rule with characteristics of an initial rule and an integrated rule taken into account.

The information processing device uses one of a rule in the individual rule storage and a rule in the integrated rule storage for the anomaly detection process. The possibility that a rule-based anomaly detection process can be performed is therefore increased compared to a case where only one of the individual rule storage and the integrated rule storage is used, in other words, a possibility that the rule-based anomaly detection process cannot be performed is decreased. The information processing device is thus capable of improving accuracy of rule-based anomaly detection.

The information processing device can prevent a frame in which an anomaly is detected in the anomaly detection process from being received by other devices connected to the in-vehicle network. It is therefore possible to prevent in advance another device from receiving a frame in which an anomaly is detected and performing an inappropriate operation. The information processing device is thus capable of improving accuracy of rule-based anomaly detection while preventing an inappropriate operation by another device.

The information processing device can notify another device or a user that there is a frame in which an anomaly is detected in the anomaly detection process. This is expected to lead to an action against the frame, and handling not to detect a similar anomaly in the future can be performed. The information processing device is thus capable of improving accuracy of rule-based anomaly detection while preventing or reducing future occurrence of an anomaly.

The information processing device can perform an appropriate one of the invalidation process and the alert process according to a detection target. This allows an action suitable for a result of the anomaly detection to be performed while the invalidation process and the alert process are selectively used according to a detection target. The information processing device is thus capable of improving accuracy of rule-based anomaly detection and performing an action after the detection appropriately.

The information processing device performs the anomaly detection process using, as an individual rule, a rule selected from among the plurality of rules, the rule being suitable for a situation of a vehicle or a situation of a vicinity of the vehicle. It is therefore possible to further improve accuracy of the anomaly detection by using an individual rule suitable for a situation of a vehicle or a situation of a vicinity of the vehicle.

The information processing device performs the anomaly detection process using, as an integrated rule, a rule selected from among the plurality of rules, the rule being suitable for a situation of a vehicle or a situation of a vicinity of the vehicle. It is therefore possible to further improve accuracy of the anomaly detection by using an integrated rule suitable for a situation of a vehicle or a situation of a vicinity of the vehicle.

The information processing device can restore an individual rule with an individual rule used in the past, that is, roll back the individual rule, before performing the anomaly detection, when a predetermined condition is satisfied. Therefore, if an individual rule becomes inappropriate, it is possible to restore a past, appropriate individual rule by determining the inappropriateness under a predetermined condition. The information processing device is thus capable of improving accuracy of rule-based anomaly detection by rolling back an individual rule when necessary.

The information processing device can restore an integrated rule with an integrated rule used in the past, that is, roll back the integrated rule, before performing the anomaly detection, when a predetermined condition is satisfied. Therefore, if an integrated rule becomes inappropriate, it is possible to restore a past, appropriate integrated rule by determining the inappropriateness under a predetermined condition. The information processing device is thus capable of improving accuracy of rule-based anomaly detection by rolling back an integrated rule when necessary.

Embodiment 2

In the present embodiment, another embodiment different from Embodiment 1 of an information processing device that improves accuracy of rule-based anomaly detection will be described. It should be noted that processing device 10A to be described later is an example of the information processing device.

Figure 10:
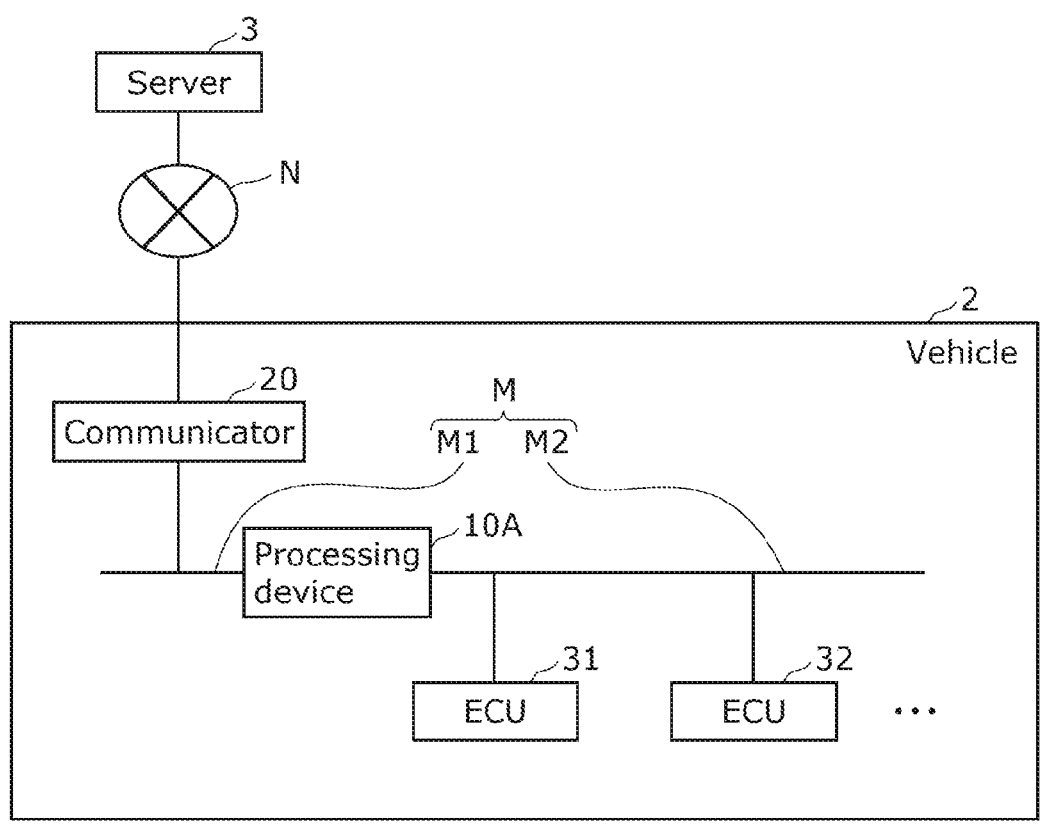
FIG. 10 is a schematic diagram illustrating a configuration of a processing system according to Embodiment 2.

FIG. 10 is a schematic diagram illustrating a configuration of a processing system according to the present embodiment.

As illustrated in FIG. 10, the processing system includes vehicle 2 and server 3. Vehicle 2 and server 3 are connected to one another via network N so that vehicle 2 and server 3 can communicate with one another. In the processing system illustrated in FIG. 10, a connecting position and a connecting mode of processing device 10A in in-vehicle network M are different from those of processing device 10 in Embodiment 1.

As with processing device 10 in Embodiment 1, processing device 10A is a device that detects unauthorized communication that can be performed in in-vehicle network M as an anomaly and performs processing for the anomaly. Processing device 10A is connected to two segments of in-vehicle network M, segments M1 and M2, with communication IF. In principle, processing device 10A transfers a frame from one to another of segment M1 and segment M2, while performing an anomaly detection process on the frame being transferred. Processing device 10A then invalidates a frame in which an anomaly is detected, by not transferring the frame in which the anomaly is detected, that is, by not allowing the transfer.

Figure 11:
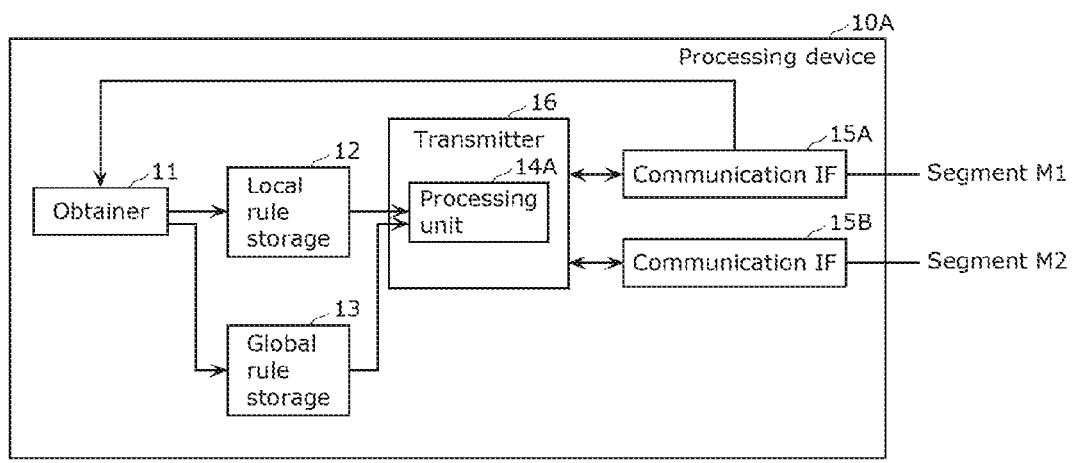
FIG. 11 is a block diagram illustrating a configuration of a processing device according to Embodiment 2.

FIG. 11 is a block diagram illustrating a configuration of processing device 10A according to the present embodiment.

As illustrated in FIG. 11, processing device 10A includes obtainer 11, local rule storage 12, global rule storage 13, processing unit 14A, communication IFs 15A and 15B, and transmitter 16. Since obtainer 11, local rule storage 12, and global rule storage 13 have the same names as those in Embodiment 1, and thus detailed description of obtainer 11, local rule storage 12, and global rule storage 13 will be omitted.

Processing unit 14A is different in that, while processing unit 14 in Embodiment 1 obtains a frame from in-vehicle network M with communication IF 15, processing unit 14A detects an anomaly in a frame that is transferred between the two communication IFs 15A and 15B.

Communication IF 15A is a communication interface device connected to in-vehicle network M (more specifically, segment M1).

Communication IF 15A receives a frame transmitted on segment M1 and provides the frame to transmitter 16. In addition, communication IF 15A transmits a frame provided by transmitter 16 to segment M1.

Communication IF 15B is a communication interface device connected to in-vehicle network M (more specifically, segment M2). Communication IF 15B receives a frame transmitted on segment M2 and provides the frame to transmitter 16. In addition, communication IF 15B transmits a frame provided by transmitter 16 to segment M2.

Transmitter 16 is a processing unit that transfers a frame between communication IFs 15A and 15B. Transmitter 16 transfer a frame provided from communication IFs 15A and 15B to communication IFs 15A and 15B according to a destination of the frame.

Processing unit 14A performs the anomaly detection process on a frame transmitted on in-vehicle network M as with processing unit 14 in Embodiment 1. Specifically, processing unit 14A obtains, via communication IFs 15A and 15B, a frame transmitted on in-vehicle network M and performs the anomaly detection process on the frame obtained, using a rule stored in at least one of local rule storage 12 or global rule storage 13.

An invalidation process performed by processing unit 14A is different from the invalidation process performed by processing unit 14 in Embodiment 1. That is, when an anomaly is detected in a frame that is provided to transmitter 16 from communication IF 15A and is to be transferred by transmitter 16 to communication IF 15B, processing unit 14A performs the invalidation process by not transferring the frame to communication IF 15B (i.e., not allowing the transfer). Likewise, when an anomaly is detected in a frame that is provided to transmitter 16 from communication IF 15B and is to be transferred by transmitter 16 to communication IF 15A, processing unit 14A performs the invalidation process by not transferring the frame to communication IF 15A (i.e., not allowing the transfer).

As described above, in processing device 10A in the present embodiment, the communication device that connects the plurality of segments M1 and M2 to one other in in-vehicle network M can detect unauthorized communication as an anomaly when transferring a frame between the segments.

In the foregoing embodiments, the respective structural components are configured of dedicated hardware but may be realized by executing a software program suited to such structural components. Alternatively, the respective structural components may be implemented by a program executor such as a CPU or a processor reading out and executing the software program recorded in a recording medium such as a hard disk or a semiconductor memory. Here, the software program for implementing the information processing device, etc., described in each of the foregoing embodiments is a program such as that described below.

Specifically, the program is a program for causing a computer to execute an information processing method executed by an information processing device that detects an anomaly in an in-vehicle network provided in a vehicle. Here, the information processing device includes: an individual rule storage in which at least an individual rule is stored, the individual rule being a rule generated for the vehicle; and an integrated rule storage in which an integrated rule is stored, the integrated rule being a rule generated for a plurality of vehicles including the vehicle. Furthermore, the information processing method includes: obtaining a frame transmitted on the in-vehicle network; and performing, using a rule stored in at least one of the individual rule storage or the integrated rule storage, an anomaly detection process on the frame obtained.

Although the information processing device, etc., according to one or more aspects has been described based on the foregoing embodiments, the present disclosure is not limited to the foregoing embodiments. The one or more aspects may therefore include forms obtained by making various modifications to the foregoing embodiments that can be conceived by those skilled in the art, as well as forms obtained by combining structural components in different embodiments, without departing from the essence of the present disclosure.

Further Information about Technical Background to this Application

The disclosures of the following patent applications including specification, drawings, and claims are incorporated herein by reference in their entirety: Japanese Patent Application No. 2019-204314 filed on Nov. 11, 2019 and PCT International Application No. PCT/JP2020/039797 filed on Oct. 22, 2020.

INDUSTRIAL APPLICABILITY

The present disclosure can be used in a processing device that detects, as an anomaly, unauthorized communication in an in-vehicle network.

The invention claimed is:

1. An information processing device that detects an anomaly in an in-vehicle network provided in a vehicle, the vehicle including at least one of a vehicle acceleration detector connected to the in-vehicle network, a vehicle body state detector connected to the in-vehicle network, a vehicle steering detector connected to the in-vehicle network, or a vehicle frame period detector connected to the in-vehicle network, the information processing device comprising:

an individual rule storage connected to the in-vehicle network and in which at least an individual rule relating to at least one of the vehicle acceleration, vehicle body state, vehicle steering or vehicle frame period is stored, the individual rule being a rule generated for the vehicle;

an integrated rule storage connected to the in-vehicle network and in which an integrated rule relating to at least one of the vehicle acceleration, vehicle body state, vehicle steering or vehicle frame period is stored, the integrated rule being a rule generated for a plurality of vehicles including the vehicle; and a processor connected to the in-vehicle network that performs, using one of the individual vehicle acceleration rule, individual vehicle body state rule, individual vehicle steering rule, or individual vehicle frame period rule, or one of the integrated vehicle acceleration rule, integrated vehicle body state rule, integrated vehicle steering rule, or integrated vehicle frame period rule stored in a respective at least one of the individual rule storage or the integrated rule storage, an anomaly detection process on a frame transmitted on the in-vehicle network, wherein when one of the individual vehicle acceleration rule, individual vehicle body state rule, individual vehicle steering rule, or individual vehicle frame period rule is stored in the individual rule storage and one of the integrated vehicle acceleration rule, integrated vehicle body state rule, integrated vehicle steering rule, or integrated vehicle frame period rule is stored in the integrated rule storage, the processor performs the anomaly detection process by at least one of: prioritizing one of the individual or integrated vehicle acceleration rules over the other, prioritizing one of the individual or integrated vehicle body state rules over the other, prioritizing one of the individual vehicle steering rules over the other, or prioritizing one of the individual vehicle frame period rules over the other, depending on whether vehicle acceleration, a vehicle body, vehicle steering, or vehicle frame is a detection target.

2. The information processing device according to claim 1, wherein an initial rule is further stored in the individual rule storage, the initial rule being a predetermined rule regarding the vehicle, and even when a rule is stored in the individual rule storage and a rule is stored in the integrated rule storage, if the initial rule is stored in the individual rule storage, the processor performs the anomaly detection process, using the integrated rule stored in the integrated rule storage.

3. The information processing device according to claim 1, wherein when a rule is stored in only one of the individual rule storage and the integrated rule storage, the processor performs the anomaly detection process using the rule which is stored.

4. The information processing device according to claim 1, wherein the processor further performs an invalidation process of invalidating the frame in which an anomaly is detected in the anomaly detection process.

5. The information processing device according to claim 1, wherein the processor further performs an alert process of outputting an alert for the frame in which an anomaly is detected in the anomaly detection process.

6. The information processing device according to claim 1, wherein the processor performs at least one process out of (i) an invalidation process of invalidating the frame in which an anomaly is detected in the anomaly detection process or (ii) an alert process of outputting an alert for the frame in which an anomaly is detected in the anomaly detection process, the at least one process being predetermined according to a detection target.

7. The information processing device according to claim 1, wherein a plurality of rules each to be applied to the vehicle in a different one of situations are stored in the individual rule storage, the at least one of a vehicle acceleration detector connected to the in-vehicle network, a vehicle body state detector connected to the in-vehicle network, a vehicle steering detector connected to the in-vehicle network, or a vehicle frame period detector performs sensing inside or outside the vehicle, and the processor selects one rule from among the one of the individual vehicle acceleration rule, individual vehicle body state rule, individual vehicle steering rule, or individual vehicle frame period rule stored in the individual rule storage, according to a result of sensing by the at least one of a vehicle acceleration detector connected to the in-vehicle network, a vehicle body state detector connected to the in-vehicle network, a vehicle steering detector connected to the in-vehicle network, or a vehicle frame period detector, and performs the anomaly detection process using, as the individual rule, the one rule selected.

8. The information processing device according to claim 1, wherein a plurality of rules each to be applied to the vehicle in a different one of situations are stored in the integrated rule storage, the at least one of a vehicle acceleration detector connected to the in-vehicle network, a vehicle body state detector connected to the in-vehicle network, a vehicle steering detector connected to the in-vehicle network, or a vehicle frame period detector performs sensing inside or outside the vehicle, and the processor selects one rule from among the one of the integrated vehicle acceleration rule, integrated vehicle body state rule, integrated vehicle steering rule, or integrated vehicle frame period rule stored in the integrated rule storage, according to a result of sensing by the at least one of a vehicle acceleration detector connected to the in-vehicle network, a vehicle body state detector connected to the in-vehicle network, a vehicle steering detector connected to the in-vehicle network, or a vehicle frame period detector, and performs the anomaly detection process using, as the integrated rule, the one rule selected.

9. The information processing device according to claim 1, further comprising:

an individual rule history storage in which the individual rule prior to updating is stored, when the individual rule stored in the individual rule storage is updated, wherein when a predetermined condition is satisfied, the processor:

copies the individual rule stored in the individual rule history storage into the individual rule storage; and performs the anomaly detection process after copying the individual rule.

10. The information processing device according to claim 1, further comprising:

an integrated rule history storage in which the integrated rule prior to updating is stored, when the integrated rule stored in the integrated rule storage is updated, wherein when a predetermined condition is satisfied, the processor:

copies the integrated rule stored in the integrated rule history storage into the integrated rule storage; and performs the anomaly detection process after copying the integrated rule.

11. An information processing method executed by an information processing device that detects an anomaly in an in-vehicle network provided in a vehicle, the vehicle including at least one of a vehicle acceleration detector connected to the in-vehicle network, a vehicle body state detector connected to the in-vehicle network, a vehicle steering detector connected to the in-vehicle network, or a vehicle frame period detector connected to the in-vehicle network, the information processing device including:
- an individual rule storage connected to the in-vehicle network and in which at least an individual rule relating to at least one of the vehicle acceleration, vehicle body state, vehicle steering or vehicle frame period is stored, the individual rule being a rule generated for the vehicle; and
- an integrated rule storage connected to the in-vehicle network and in which an integrated rule relating to at least one of the vehicle acceleration, vehicle body state, vehicle steering and vehicle frame period is stored, the integrated rule being a rule generated for a plurality of vehicles including the vehicle, the information processing method comprising:
obtaining a frame transmitted on the in-vehicle network; and
performing, by a processor connected to the in-vehicle network and using a one of the individual vehicle acceleration rule, individual vehicle body state rule, individual vehicle steering rule, or individual vehicle frame period rule, or one of the integrated vehicle acceleration rule, integrated vehicle body state rule, integrated vehicle steering rule, or integrated vehicle frame period rule stored in a respective at least one of the individual rule storage or the integrated rule storage, an anomaly detection process on the frame obtained, wherein in the performing of the anomaly detection process, when one of the individual vehicle acceleration rule, individual vehicle body state rule, individual vehicle steering rule, or individual vehicle frame period rule is stored in the individual rule storage and one of the integrated vehicle acceleration rule, integrated vehicle body state rule, integrated vehicle steering rule, or integrated vehicle frame period rule is stored in the integrated rule storage, the anomaly detection process is performed by the processor by at least one of: prioritizing one of the individual or integrated vehicle acceleration rules over the other, prioritizing one of the individual or integrated vehicle body state rules over the other, prioritizing one of the individual vehicle steering rules over the other, or prioritizing one of the individual vehicle frame period rules over the other, depending on whether vehicle acceleration, a vehicle body, vehicle steering, or vehicle frame is a detection target.

\* \* \* \* \*